United States Patent
Pedrini

(10) Patent No.: US 8,733,605 B2
(45) Date of Patent: May 27, 2014

(54) BICYCLE-CARRYING DEVICE FOR MOTOR-VEHICLES

(76) Inventor: Fabio Pedrini, Bologna (IT)

( * ) Notice: Subject to any disclaimer, the term of this patent is extended or adjusted under 35 U.S.C. 154(b) by 149 days.

(21) Appl. No.: 13/149,046

(22) Filed: May 31, 2011

(65) Prior Publication Data

US 2011/0290839 A1    Dec. 1, 2011

(30) Foreign Application Priority Data

Jun. 1, 2010   (IT) .............. TO2010A0462

(51) Int. Cl.
*B60R 9/06* (2006.01)
*B60R 9/10* (2006.01)

(52) U.S. Cl.
USPC ........... 224/488; 224/924; 224/572; 224/534; 224/500; 224/501

(58) Field of Classification Search
USPC ............... 224/924, 572, 533–534, 537, 488, 224/492–493, 500–501, 309, 314, 224/324–325; 211/17–22; 410/3; D12/407–408
See application file for complete search history.

(56) References Cited

U.S. PATENT DOCUMENTS

| | | | |
|---|---|---|---|
| 3,752,375 A * | 8/1973 | Weigl | 224/493 |
| 3,921,869 A | 11/1975 | Rogers | |
| 4,182,467 A | 1/1980 | Graber | |
| 4,183,452 A * | 1/1980 | MacDonald, Jr. | 224/401 |
| 4,219,142 A * | 8/1980 | Macpherson | 224/324 |
| 4,386,709 A | 6/1983 | Graber | |
| 5,230,449 A * | 7/1993 | Collins et al. | 224/493 |
| 5,690,259 A | 11/1997 | Montani | |
| 5,709,521 A * | 1/1998 | Glass et al. | 414/462 |
| 6,783,041 B2 | 8/2004 | Ford et al. | |
| 6,866,175 B2 * | 3/2005 | Munoz et al. | 224/324 |
| 2006/0196906 A1 * | 9/2006 | Gibson, Jr. | 224/403 |
| 2006/0273126 A1 * | 12/2006 | Pedrini | 224/536 |

FOREIGN PATENT DOCUMENTS

| | | |
|---|---|---|
| DE | 9107286 U1 | 8/1991 |
| DE | 102007035135 B3 | 2/2009 |
| EP | 0143065 * | 5/1985 |
| GB | 2394930 A | 5/2004 |
| WO | 02079003 A1 | 10/2002 |
| WO | WO02079003 | 10/2002 |
| WO | 03064214 A1 | 8/2003 |
| WO | 2006129177 A1 | 12/2006 |

OTHER PUBLICATIONS

Translated abstract of EP0143065.*

* cited by examiner

*Primary Examiner* — Justin Larson
*Assistant Examiner* — Scott McNurlen
(74) *Attorney, Agent, or Firm* — Boyle Fredrickson, S.C.

(57) ABSTRACT

A bicycle-carrying device for motor-vehicles comprises a frame which is mounted on the rear part of a motor-vehicle and is provided with receptacles for supporting one or more bicycles in vertical planes parallel to the longitudinal direction of the motor-vehicle, without hiding from view substantial portions of the rear plate and/or the rear lights of the motor-vehicle.

21 Claims, 10 Drawing Sheets

BICYCLE-CARRYING DEVICE FOR MOTOR-VEHICLES

FIELD OF THE INVENTION

The present invention relates to bicycle-carrying devices for motor-vehicles, of the type comprising a frame, means for mounting the frame on the rear portion of a motor-vehicle, and supporting means carried by the frame and adapted for supporting at least one bicycle, provided with both its wheels, in a vertical plane parallel to the longitudinal direction of the motor-vehicle.

PRIOR ART

Bicycle-carrying devices of the above-indicated type have been disclosed for example in documents U.S. Pat. No. 6,783, 041, GB-A-2 394 930, WO-A-03 064 214, U.S. Pat. No. 6,866,175, WO-A-02 079 003, U.S. Pat. No. 5,690,259. These devices are distinguished both from bicycle-carrying devices which are mounted above the motor-vehicle roof, that have the drawback to render the operations for loading and unloading the bicycle uncomfortable and cumbersome for the user, and from devices which provide for an arrangement of the bicycles behind the rear portion of the motor-vehicle, transversally with respect to the longitudinal direction of the latter, and that have the drawback to hide from view the motor-vehicle rear plate and at least in part the motor-vehicle rear lights.

None of the bicycle-carrying devices known to the applicant of the type which provides for the longitudinal arrangement of the bicycles behind the motor-vehicle has resulted however in being fully satisfactory. Some of these devices require that one of the two wheels of the bicycle is dismantled, which obviously implies an inconvenience and a loss of time for the user. Furthermore, many of the devices of this type which have been proposed heretofore require the presence on the motor-vehicle of a hitch support, or a carrying rack on the roof, to be used as supports for connection of the frame of the bicycle-carrying device.

OBJECT OF THE INVENTION

The object of the invention is that of overcoming these drawbacks, by providing a bicycle-carrying device that enables the longitudinal mounting of one or more bicycles behind the rear portion of the motor-vehicle without requiring dismantling a bicycle wheel and further enabling the user to perform the loading and unloading of the bicycle with easy and quick operations.

A further object of the invention is that of providing a bicycle-carrying device of the above-indicated type which has a relatively simple and inexpensive structure.

A further object of the invention is that of providing a bicycle-carrying device of the above-indicated type which ensures that in their mounted condition the bicycles do not hide from view substantial portions of the rear plate and the rear lights of the motor-vehicle.

A further object of the invention lies in that of providing a bicycle-carrying device of the above-indicated type which can be mounted on a motor-vehicle without requiring the motor-vehicle to be provided with a hitch support or a roof carrier, or any other support secured to the motor-vehicle structure.

Finally, it is also an object of the invention to provide a bicycle-carrying device of the above-indicated type which can be adapted on motor-vehicles of any configuration, in particular both on fast-back or sedan cars, as well as on station wagons and minivans.

SUMMARY OF THE INVENTION

In view of achieving the above-indicated objects, the invention provides a bicycle-carrying device for motor-vehicles, comprising a frame, means for mounting the frame on the rear portion of a motor-vehicle and supporting means carried by the frame and adapted to support at least one bicycle, provided with both its wheels, in a vertical plane parallel to the longitudinal direction of the motor-vehicle, wherein said means for mounting the frame on the rear portion of the motor-vehicle include a plurality of feet carried by the frame and adapted to rest on the rear portion of the motor-vehicle and a plurality of hook members carried by strap elements (or any other flexible connecting element) which can be put under tension, said strap elements being connected to the frame, said hook members being for engaging portions of the motor-vehicle body, and wherein said bicycle supporting means include at least one upper receptacle and at least one lower receptacle carried by said frame, which are for receiving the two wheels of a bicycle respectively and provided with means for clamping the wheels of the bicycle thereon.

As it can be seen, a basic feature of the bicycle-carrying device according to the invention lies in that the frame of the device can be mounted on the motor-vehicle without requiring the provision of a hitch support on the motor-vehicle or a carrying rack on the roof of the motor-vehicle or any other support rigidly connected to the motor-vehicle structure. Indeed the frame simply rests with its feet on the rear part of the motor-vehicle and is held against it by the above mentioned strap elements provided with hooks which engage parts of the motor-vehicle body.

Preferably, the bicycle-carrying device according to the invention comprises at least two pairs of receptacles, each pair comprising an upper receptacle and a lower receptacle, the upper and lower receptacles of the two pairs being aligned along two vertical longitudinal planes spaced from each other so as not to hide from view substantial portions of the rear plate and/or the rear lights of the motor-vehicle.

In the case of the preferred embodiment, the frame of the bicycle-carrying device comprises an upper cross-member and two uprights extending downwardly from the upper cross-member. The two upper receptacles are associated with said cross-member, whereas the two lower receptacles are associated with the uprights and are adjustable in position along them.

Also in the case of the preferred embodiment, the above-mentioned feet comprise two upper feet carried by the cross-member and two lower feet carried by the two uprights respectively and adjustable in position along the uprights.

Preferably, the above mentioned hook members comprise two upper hooks carried by respective upper strap elements connected to the cross-member, two lower hooks carried by respective lower strap elements connected to the lower ends of the uprights and two side hooks carried by respective side strap elements and connected to said cross-member or said uprights. Also preferably, the two uprights are connected to each other by a transverse strap element whose ends are connected to the two uprights substantially at the same positions at which the strap elements of the side hooks are connected. The strap elements are connected to the respective anchoring part (cross-member or upright) by means of a buckle for tensioning the strap, which is anchored to the cross-member or the upright and is engaged by the strap element.

Each of the above mentioned features contributes to render mounting and dismantling of the device easy and quick and further enables it to be easily adapted to any configuration of car.

BRIEF DESCRIPTION OF THE DRAWINGS

Further features and advantages of the invention will become apparent from the description which follows with reference to the annexed drawings, given purely by way of non limiting example, in which.

DESCRIPTION OF SOME PREFERRED EMBODIMENTS

Figure 1:
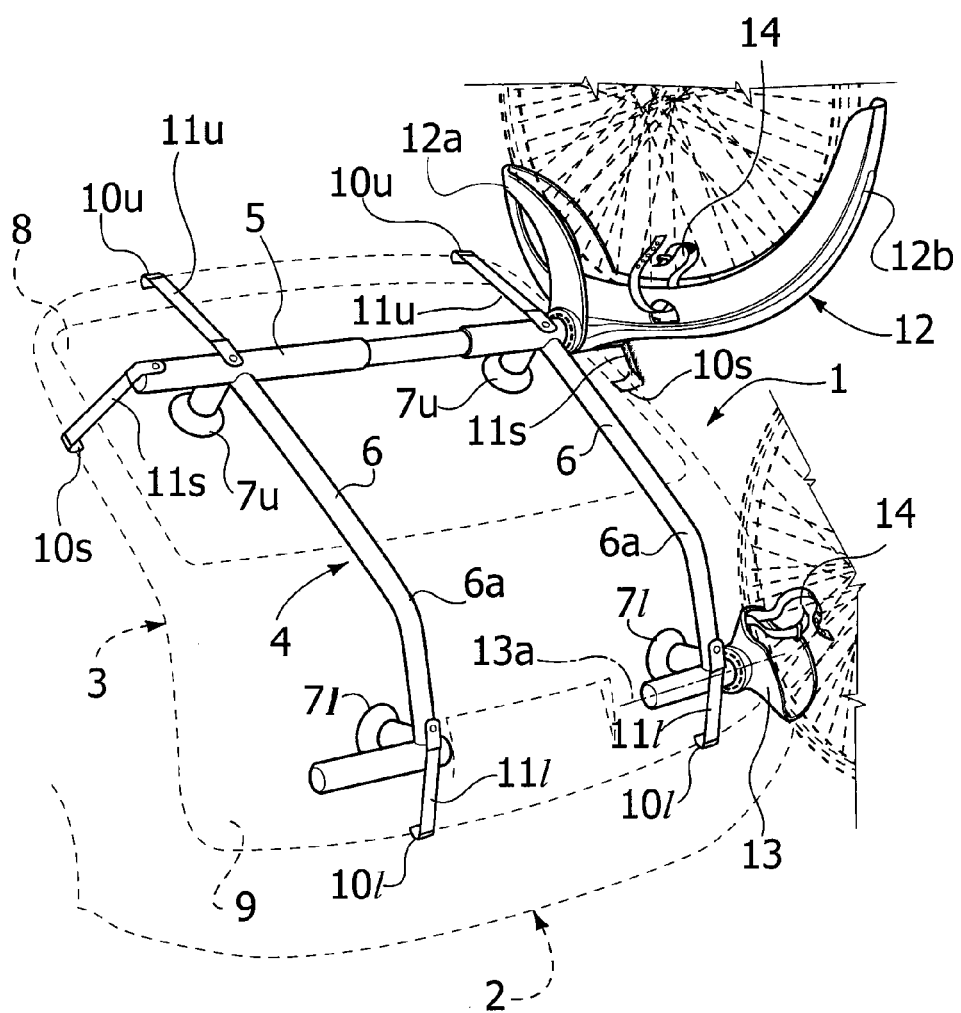
FIG. 1 is a diagrammatic perspective view of a first embodiment of the bicycle-carrying device according to the invention.
Figure 2:
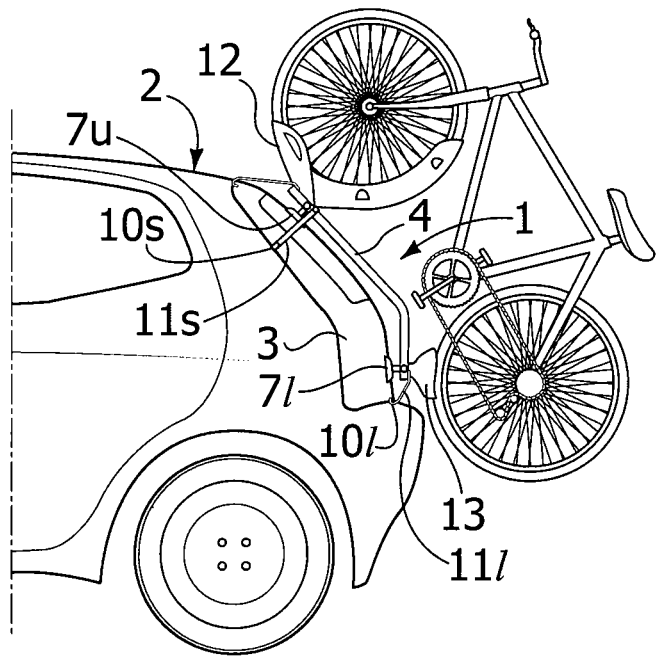
FIGS. 2, 3 are side views which show the device of FIG. 1 in the condition of use, the device being mounted on the rear part of a motor-vehicle, these views showing the rear door of the motor-vehicle in a closed and opened condition, respectively.
Figure 3:
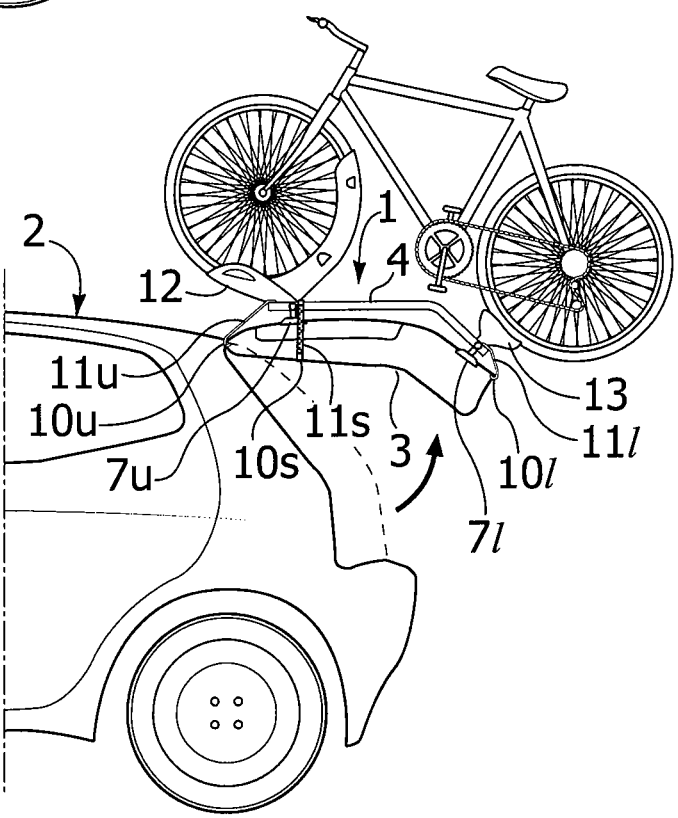

With reference to FIGS. 1-3, numeral 1 generally designates a bicycle-carrying device which can be mounted on the rear part of a motor-vehicle 2, specifically, in the case of the illustrated example, on the rear door 3 of a motor-vehicle 2, which can be moved between a closed position shown in FIG. 2 and an opened position shown in FIG. 3.

The bicycle-carrying device 1 comprises a frame 4 including a cross-member 5 from which there extend downwardly two uprights 6 each having an elbow 6a so as to follow the profile of the rear door 3. The cross-member 5 and the uprights 6 are provided with at least two upper feet 7u, connected to the cross-member 5 and at least two lower feet 7l, connected to the uprights 6, provided with a coating made of rubber or plastic material, these feet being for resting against the rear part of the motor-vehicle, in the case of the illustrated example against the rear window 8 and the lower vertical wall 9 forming part of the rear door 3. The feet can be orientable and/or floating, to be able to adapt to the shape of the body of the motor-vehicle.

Frame 4 is secured in this position by means of a plurality of hooks 10 which engage the peripheral edge of the rear door 3 and are carried by strap elements 11 of any known type (preferably each strap is provided with a buckle, not shown in FIG. 1, to enable it to be put under tension) or any other equivalent flexible element. The strap elements 11 are connected to frame 4. In the case of the specific example shown, there are provided two upper hooks 10u connected to the cross-member 5 by means of strap elements 11u and adapted to engage the upper edge of the rear door 3, two lower hooks 10l connected to the uprights 6 by means of strap elements 11l, for engagement of the lower edge of the rear door 3 and two side hooks 10s, which are connected to the cross-member 5 by means of strap elements 11s, respectively for engagement of the left edge and the right edge of the rear door 3.

The bicycle-carrying device 1 comprises supporting means for a pair of bicycles by which two bicycles can be supported in vertical planes parallel to the longitudinal direction of a motor-vehicle, immediately behind the rear door 3, as shown in FIGS. 2, 3. To this end, each end of the cross-member 5, adjacent to the respective upright 6, carries an upper receptacle 12 so that the latter can be oriented around the axis of the cross-member 5, whereas the respective upright 6 carries a lower receptacle 13 adjacent to its lower end, which lower receptacle can be oriented around a transverse axis 13a. The receptacles 12, 13 are for receiving the two wheels of a respective bicycle, as shown in FIGS. 2, 3. For sake of clarity, FIG. 1 shows only one pair of receptacles 12, 13, while the other pair of receptacles 12, 13 mounted on the left side of the device have been removed for better showing the structure of the device. Once the bicycle wheels have been received within receptacles 12, 13, they can be anchored to the latter by means of clamping means of any known type, for instance by means of one or more clamping belts 14.

According to the invention, the structure of receptacles 12, 13 can be similar to that described in document WO 2006/129177 A1 of the same Applicant (which relates to a bicycle-carrying device with a "transverse" arrangement of the bicycles). According to this solution, the upper receptacle 12 is comprised of two portions 12a and 12b separate from each other and adjustable both with regard to the position of the entire receptacle 12 around the axis of cross-member 5, and with regard to the mutual angular positions of the two portions 12a, 12b around this axis. The receptacle 12 and the receptacle 13 are provided with unlocking buttons for adjustment of the position. These details are not described and shown herein, since they are known per se from document WO 2006/129177 A1.

As clearly apparent from the foregoing description, the bicycles can be mounted on the device according to the invention with easy and quick operations. Furthermore, the device itself can be mounted or removed from the motor-vehicle by simple and quick operations.

In the case of the example of FIG. 1, the cross-member 5 has a telescopic structure, which can be provided with locking means of any known type (not shown), for locking the elements constituting the cross-member, in order to adjust the mutual distance of the two uprights 6 at will. Thus, the two planes in which the two bicycles are arranged can be positioned by the user so as not to hide from view the rear plate of the motor-vehicle and the rear lights of the motor-vehicle.

An important advantage of the device according to the invention lies therefore in that it enables the bicycles to be placed behind the motor-vehicle, with easy and quick operations (contrary to what happens with bicycle-carrying devices which are mounted above the roof of the motor-vehicle) without involving at the same time the drawback of hiding from view the rear plate and the rear lights of the motor-vehicle (as it happens instead in the case of devices which provide for a transverse arrangement of the bicycles behind the motor-vehicle).

A further advantage of the device according to the invention with respect to other known devices which provide for the longitudinal arrangement of the bicycles behind the motor-vehicle is that it does not require one wheel of the bicycle to be dismantled nor it requires the provision on the motor-vehicle of a hitch support or any other supporting element secured to the vehicle structure, to which the frame of the device should be connected.

As visible in FIGS. 2, 3, if the device is mounted on the rear door of a motor-vehicle, it enables to use the rear door for accessing the luggage compartment of the motor-vehicle even with the bicycles mounted.

FIGS. 4, 4A, 4B, 4C, 4D and 5 show a first preferred embodiment of the invention which differs in some aspects, but not in the essential elements, from the solution shown in FIG. 1. Therefore, in these figures the various parts of the device common to those of FIG. 1 have been indicated by the same reference numerals.

Figure 4:
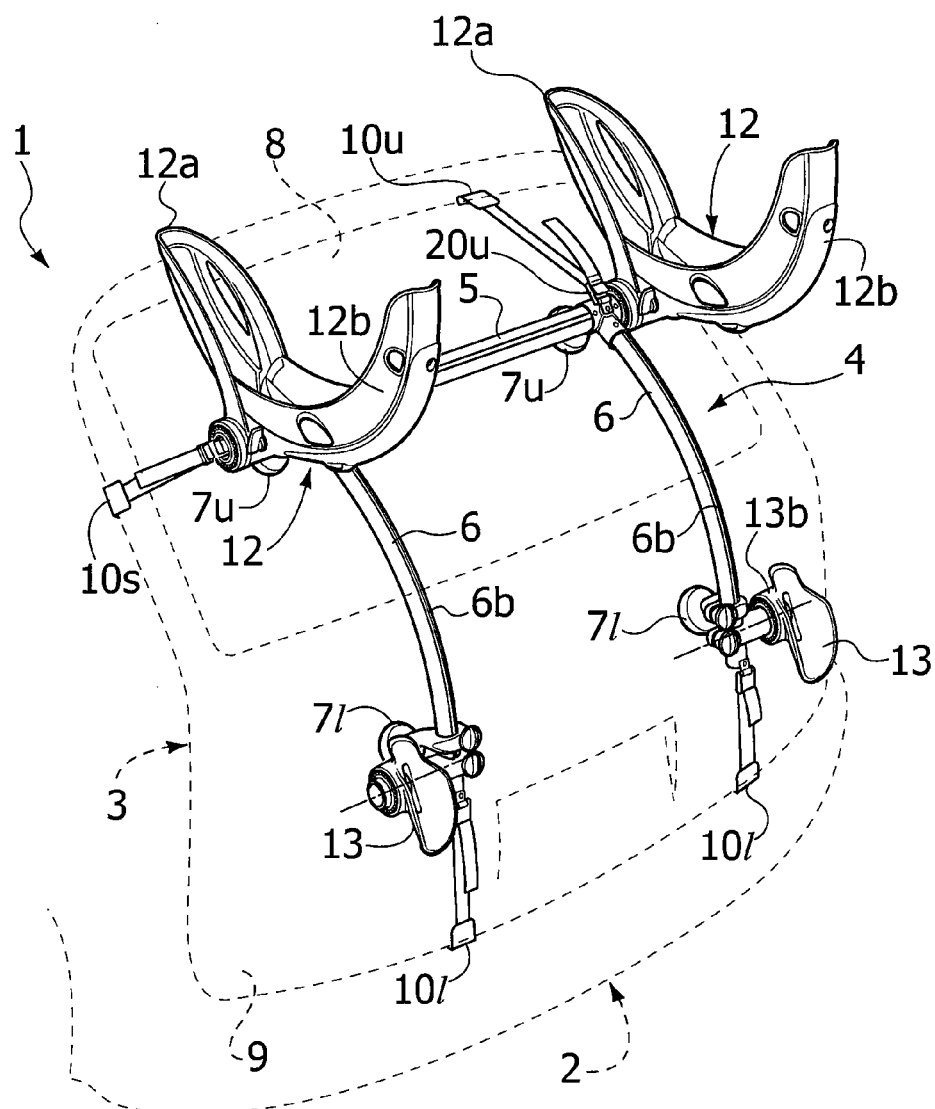
FIG. 4 is a perspective view of a further preferred embodiment of the device according to the invention.
Figure 4A:
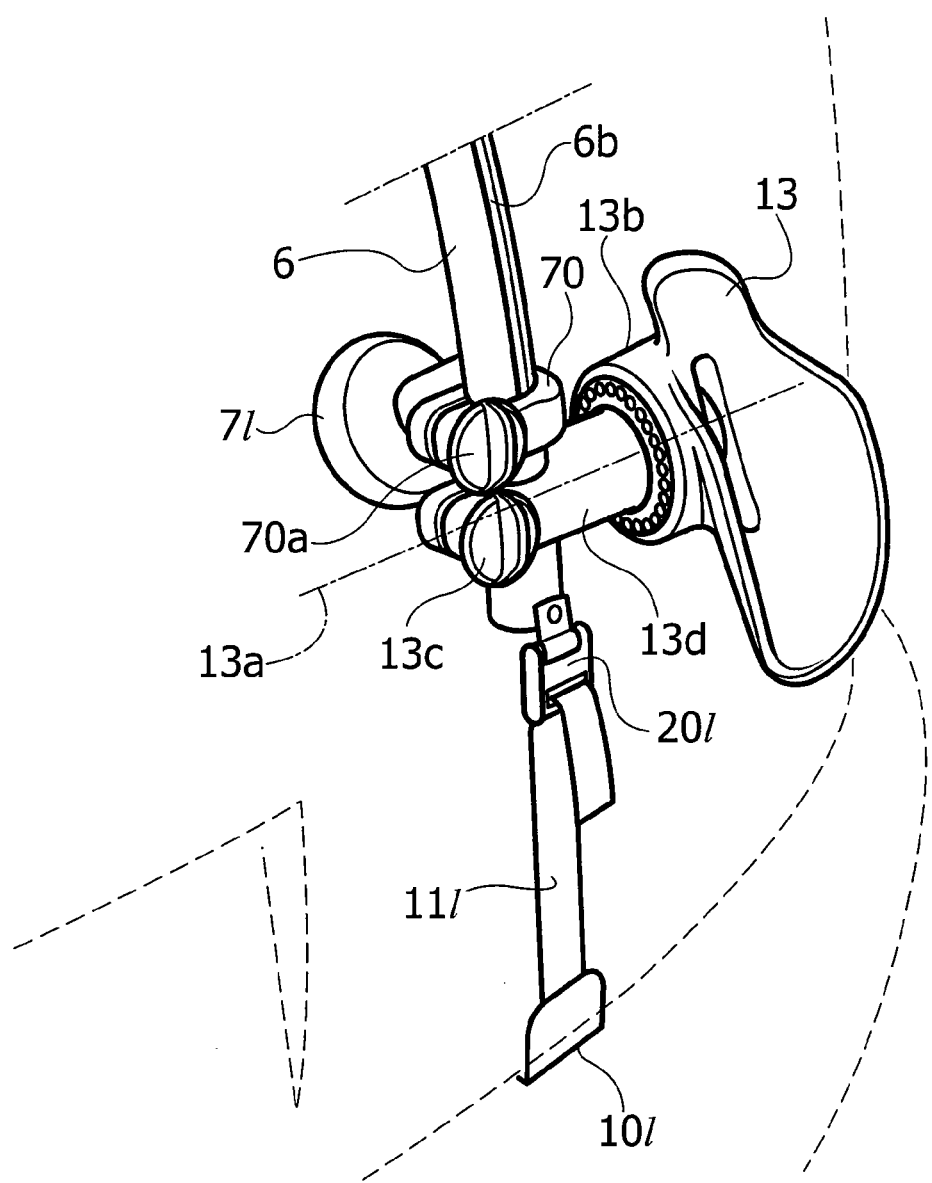
FIG. 4A shows a detail of FIG. 4 at an enlarged scale.

As shown also in the detail of FIG. 4A, in this embodiment the lower feet 7*l* are adjustable in position along the respective upright 6. To this end, each foot 7*l* is carried by a clamp-like body 70 which can be clamped over the upright 6 by a screw provided with a knob 70*a*. Inside thereof, the clamp-like body 70 has two teeth slidably engaged within two diametrically opposite slots 6*b* of the upright 6 which is constituted by a tube with a circular cross-section (see also FIG. 4B). By untightening the locking screw through knob 70*a*, it is possible to slide the clamp-like body 70 along the upright 6 and then to lock it at any desired position.

Figure 4B:
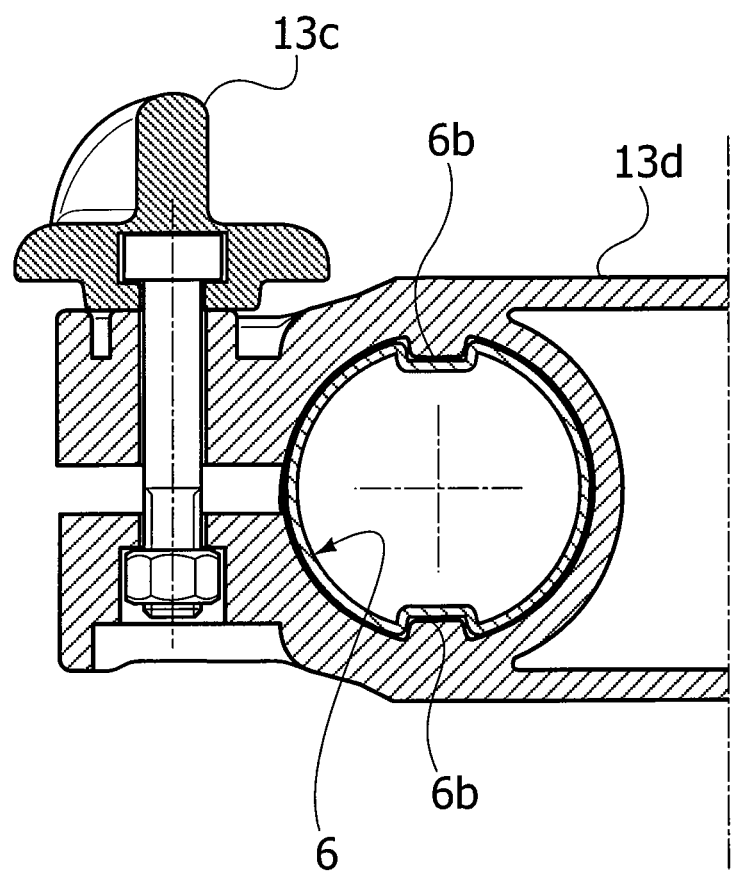
FIG. 4B shows a cross-sectional view of a detail of FIG. 4A, FIGS. 4C, 4D show two further details of FIG. 4 at an enlarged scale.

Also with reference to FIG. 4A, also the lower receptacles 13 are adjustable in position along the respective uprights 6. To this end, each receptacle 13 is carried by a body 13*b* which is mounted so that it can be oriented around axis 13*a* on a transverse tubular portion of a clamp-like body 13*d* also engaged on the upright 6. FIG. 4B shows the cross-section of this clamp-like body 13*d*, with the locking screw provided with a knob 13*c* and teeth slidably engaging the slots 6*b* of uprights 6. By untightening the locking screw by means of the knob 13*c*, it is possible to slide the clamp-like body 13*d* along the upright 6 and then to lock it at any desired position. The body 13*b* also can be oriented around axis 13*a* with respect to the transverse tubular portion of body 13*d* and can be locked at any desired position by means of a screw (not shown in the drawing) which engages the body 13*b* and the portion 13*d* along a diameter.

Figure 4C:
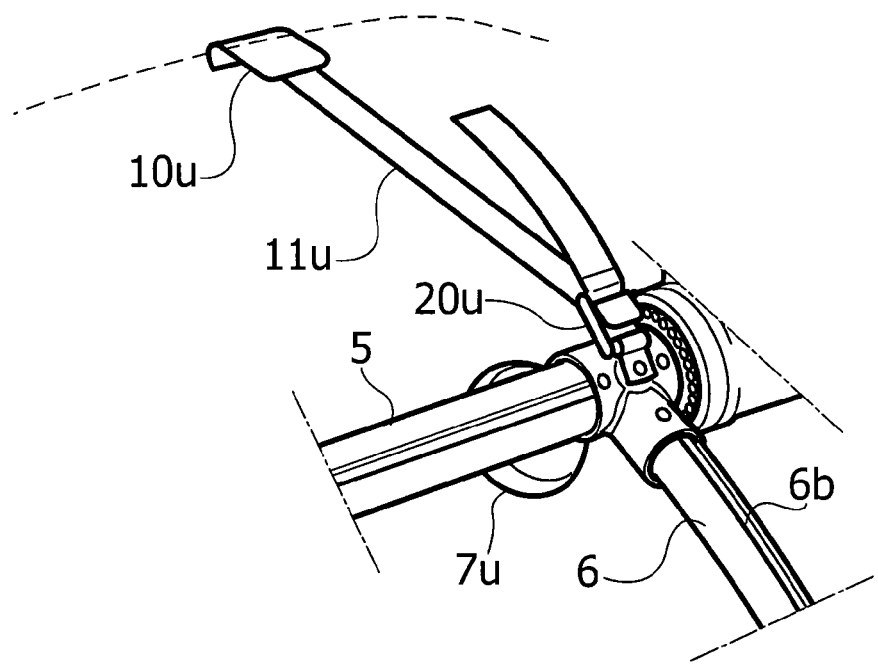
Figure 4D:
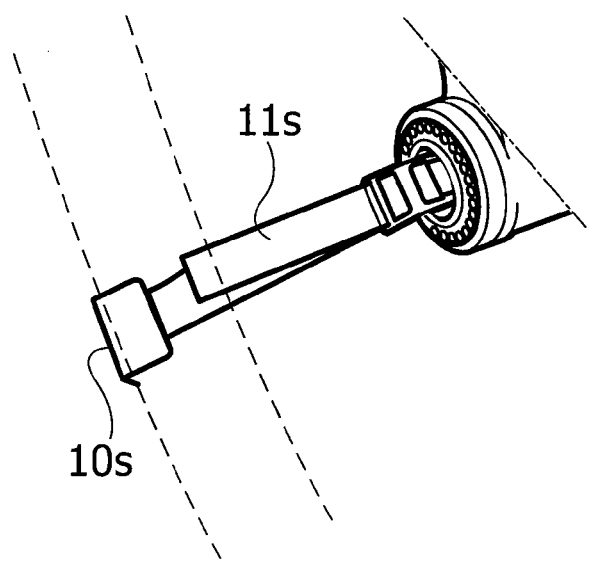

FIG. 4A also shows the detail of the lower hook 10*l* secured to one end of a lower strap element 11*l* whose opposite end is engaged through a buckle 20*l* which is secured to the lower end of the upright 6. FIGS. 4C and 4D show at an enlarged scale the details of an upper hook 10*u* and a side hook 10*s* connected to the ends of strap elements 11*u* and 11*s* engaged within buckles 20*u* and 20*s* carried by the cross-member 5.

Figure 5:
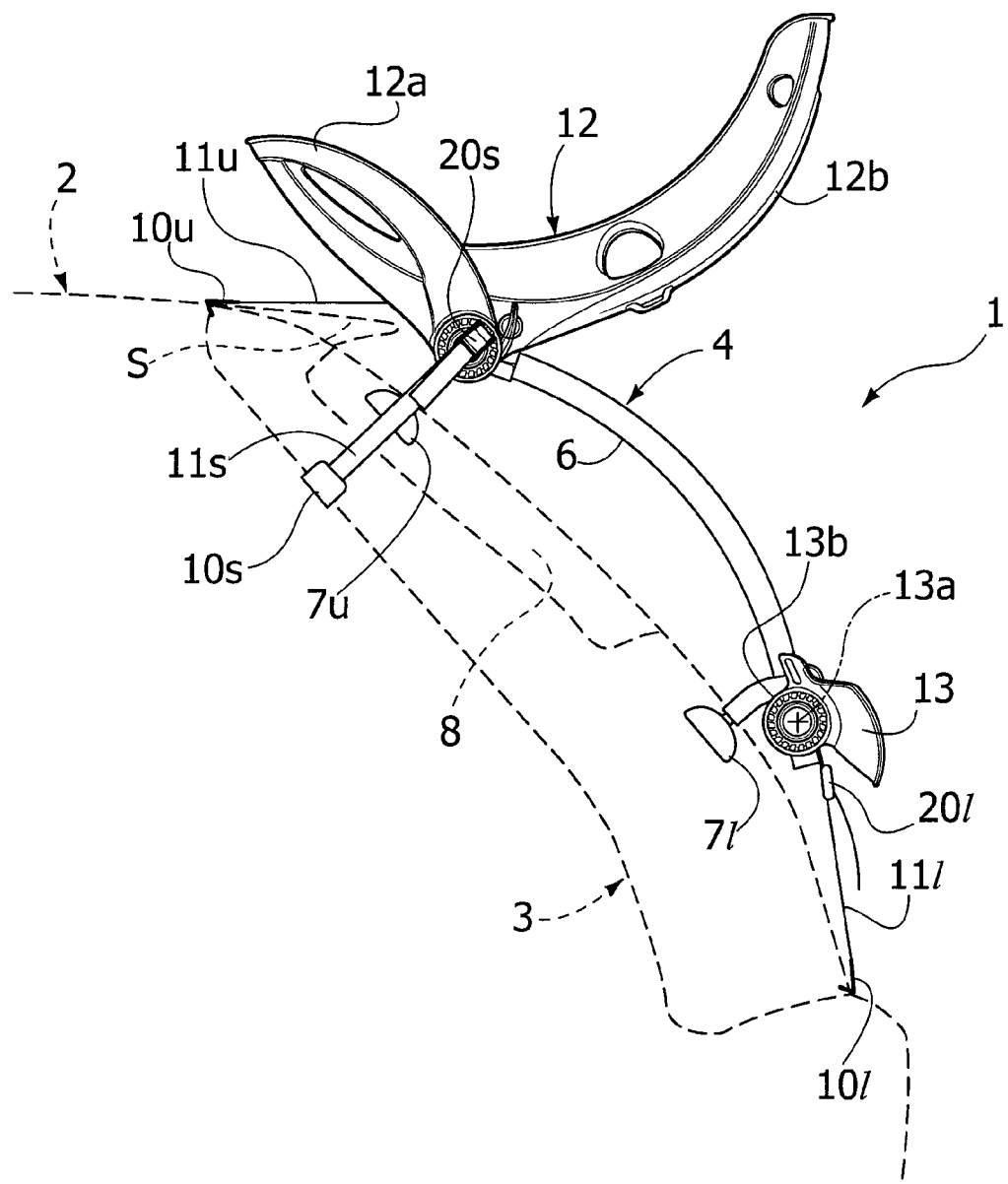
FIG. 5 is a side view of the device of FIG. 4.

As clearly visible in FIG. 5, the bicycle-carrying device according to the invention can be secured behind the rear part of a motor vehicle with no need of a rigid connection to the supporting structure of the vehicle or to a member anchored to the supporting structure, such as a hitch support or a rack carrier mounted on the roof of the motor-vehicle. The feet 7 simply rest on the motor-vehicle body and the device is stably secured in position by the engagement of hooks 10 and tensioning of the strap elements 11, with the aid of buckles 20. FIG. 5 shows how frame 4 and feet 7 are shaped so that, in the mounted condition on the motor-vehicle (in particular in the case of a fast-back vehicle, with upper hooks 10*u* engaged on the upper edge of the rear door of the motor-vehicle) the upper strap elements 11*u* are out of interference with a spoiler S or any similar projecting elements provided along the rear edge of the roof. As shown, in this mounted condition the upper strap elements 11*u* extend substantially horizontally (or even with a slight upward inclination) starting from the respective hooks 10*u*, so as to avoid the interference with spoiler S, which is typically made of plastic material and therefore is relatively fragile.

Figure 6:
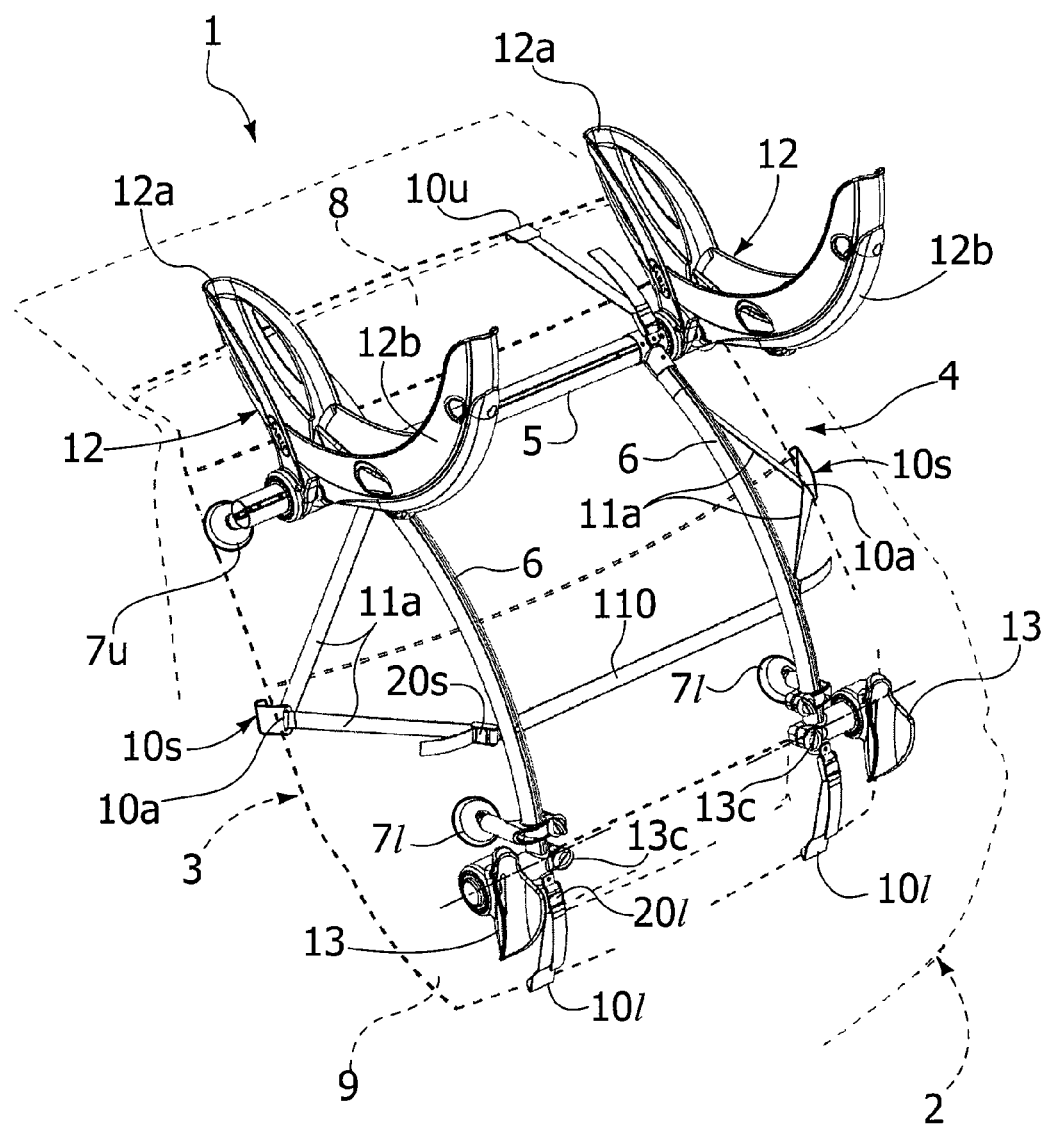
FIG. 6 is a perspective view of a further preferred embodiment of the device according to the invention.
Figure 7:
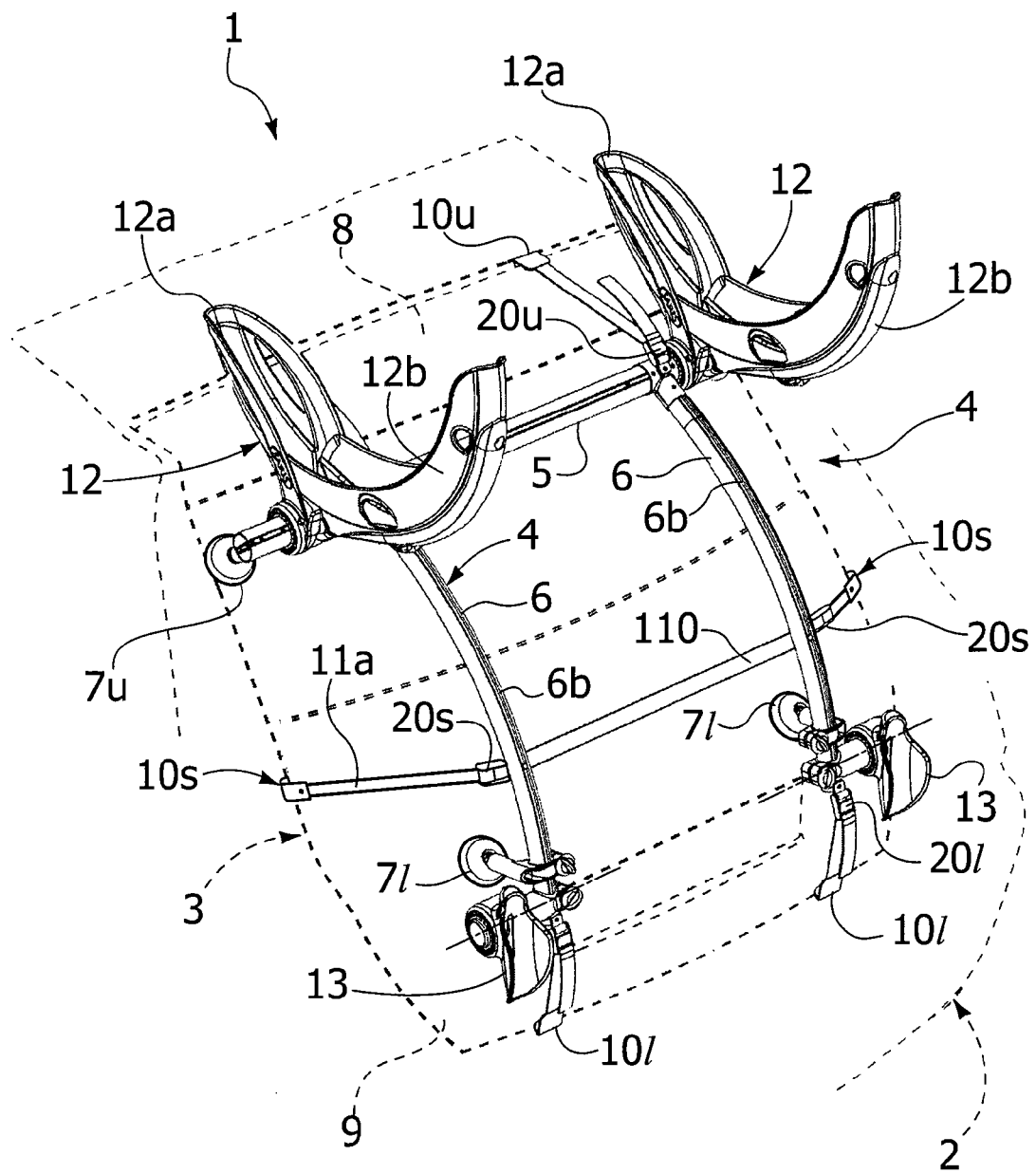
FIG. 7 is a perspective view of still a further preferred embodiment of the device according to the invention.
Figure 8:
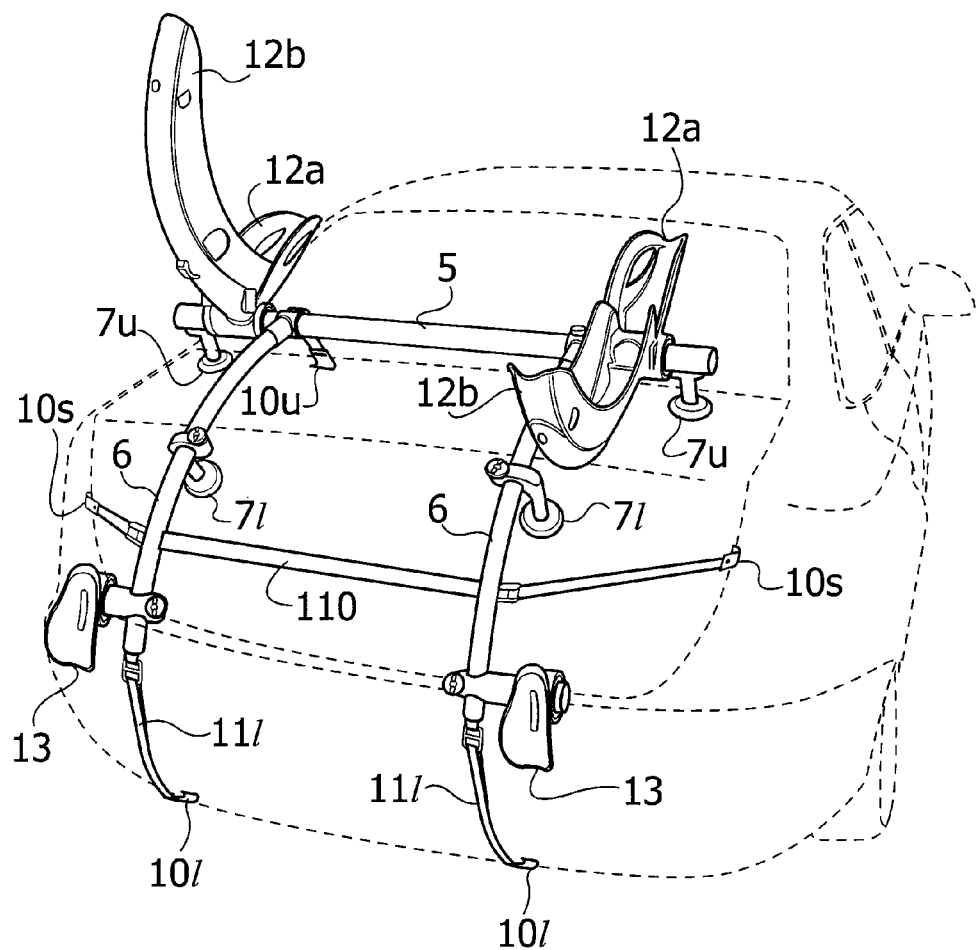
FIG. 8 shows the use of the device of FIG. 7 on a sedan car.

In the case of the embodiment of FIG. 4, as well as in those of FIGS. 6 and 7, 8, cross-member 5 is not adjustable in length (although this feature could of course be provided) and the two uprights 6 are positioned on the cross-member 5 at a distance slightly greater than the maximum horizontal dimension of a rear plate of a motor-vehicle.

All the embodiments have upper receptacles 12 of the type already described with reference to FIG. 1. FIG. 6 differs from FIG. 4 in that the side hooks 10*s* are connected to the upright 6 rather than to the cross-member 5. To this end, each side hook 10*s* has an aperture 10*a* for passage of a strap element having ends connected to two portions spaced apart from each other of a respective upright 6, one of these ends being engaged within a buckle 20*s* secured to the upright. In this manner, the side hooks can be engaged below the rear window, where the structure of the rear door is stronger, whereas the two runs 11*a* of the strap which extend from the side hook are automatically arranged so as to transmit the forces to the respective upright in a balanced way.

Furthermore, in the case of the embodiment of FIG. 6, as also in that of FIGS. 7, 8, the two uprights 6 are connected to each other by a transverse strap 110, so that the side forces are transmitted by each upright to the other. Furthermore, in the case of FIGS. 6-8 the two upper feet 7*u* are connected to the ends of the cross-member 5, so that they do not interfere with the view of the driver through the rear window of the motor-vehicle.

The embodiment of FIG. 7 differs from that of FIG. 6 only in that the side hooks 10*s* are each secured to the end of single side strap element 11*s*, which can be put under tension by means of a respective buckle 20*s* secured to the respective upright 6.

FIG. 8 shows the engagement of the device of FIG. 7 on a sedan car. As shown, the device can be easily adapted to this configuration of car, by mounting the lower feet 7*l* at a position spaced from the lower ends of the uprights 6.

All the embodiments of FIGS. 4-8 have uprights which do not have the elbow 6*a* of FIG. 1, but anyway are provided with a curvature, so that they do not interfere with the profile of the motor-vehicle.

Naturally, while the principle of the invention remains the same, the details of construction and the embodiments may widely vary with respect to what has been described and shown purely by way of example, without departing from the scope of the present invention.

The invention claimed is:

1. A bicycle-carrying device for motor-vehicles, comprising
a frame having a pair of laterally spaced apart upright frame members and a cross-member extending therebetween,
means for mounting the frame on the rear portion of a motor-vehicle, and
supporting means carried by the frame and adapted for supporting at least one bicycle, provided with both its wheels, in a vertical plane parallel to the longitudinal direction of the motor-vehicle so that each of the at least one bicycle defines an upper wheel and a lower wheel when the at least one bicycle is supported by the supporting means,
wherein said means for mounting the frame on the rear portion of the motor-vehicle includes a plurality of feet carried by the frame and configured to rest on the rear portion of the motor-vehicle, wherein the plurality of feet includes a pair of adjustable feet, wherein each adjustable foot is movably mounted for movement along one of the upright frame members, and wherein the means for mounting the frame on the rear portion of the motor-vehicle further includes a plurality of hook members carried by strap elements which are connected to the frame, said hook members being for engaging portions of the body of the motor-vehicle, and wherein said supporting means includes at least one upper receptacle and at least one lower receptacle carried by said frame, wherein the upper and lower receptacles are configured to receive the two wheels of a bicycle respectively and are provided with means for clamping the bicycle wheels thereon, the at least one upper receptacle having a portion extending along at least a segment of an outer circumferential surface of the upper wheel of the respective bicycle to engage a downwardly facing portion of the outer circumferential surface of the upper wheel for supporting the bicycle at the upper wheel from below, and wherein at least one of the upper and lower receptacles is movably mounted for movement along one of the upright frame members, wherein the adjustable feet and the movable one of the upper and lower receptacles are separately mounted to and movable on the upright frame member to variable positions along the upright frame member independently of each other.

2. A bicycle-carrying device according to claim 1, further comprising at least two pairs of receptacles, each pair comprising an upper receptacle and a lower receptacle, the upper and lower receptacles of the two pairs being aligned along two vertical longitudinal planes which are spaced apart from each other so as not to hide from view substantial portions of the rear plate and/or the rear lights of the motor-vehicle.

3. A bicycle-carrying device according to claim 1, wherein the cross-member of the frame defines a pair of ends, and wherein each pair of receptacles comprises an upper receptacle mounted adjacent to each end of said cross-member, and a lower receptacle mounted on each upright.

4. A bicycle-carrying device according to claim 3, wherein said feet include two upper feet carried by the cross-member and two lower feet respectively carried by said uprights.

5. A bicycle-carrying device according to claim 4, wherein the adjustable feet comprise the two lower feet that are adjustable in position along the respective uprights.

6. A bicycle-carrying device according to claim 3, wherein said lower receptacles are adjustable in position along the respective uprights.

7. A bicycle-carrying device according to claim 3, wherein said lower receptacles are orientable around a transverse axis.

8. A bicycle-carrying device according to claim 3, wherein said cross-member is adjustable in length.

9. A bicycle-carrying device according to claim 3, wherein each upper receptacle is carried by the cross-member so that it can be oriented around the axis of the cross-member.

10. A bicycle-carrying device according to claim 3, wherein each upper receptacle comprises two separate elements whose mutual angular position around the axis of the cross-member is adjustable.

11. A bicycle-carrying device according to claim 3, wherein said hook members comprise at least two upper hooks carried by respective upper strap elements connected to the cross-member and at least two lower hooks carried by respective lower strap elements connected to the lower ends of the uprights.

12. A bicycle-carrying device according to claim 11, wherein said hook members also comprise two side hooks carried by respective side strap elements connected to said cross-member or said uprights.

13. A bicycle-carrying device according to claim 12, wherein each side hook has an aperture for passage of a side strap element having its ends connected to two portions of a respective upright which are spaced from each other.

14. A bicycle-carrying device according to claim 12, wherein each side hook is connected to one end of a side strap element whose opposite end is connected to a respective upright.

15. A bicycle-carrying device according to claim 13, wherein the two uprights are connected to each other by a transverse strap element, whose ends are connected to the two uprights substantially at the same positions at which the two side strap elements are connected.

16. A bicycle-carrying device according to claim 3, wherein one or more of said strap elements are connected to the cross-member or one of said uprights by means of a buckle for tensioning the strap element, said buckle being connected to the respective cross-member or upright and being engaged by the strap element.

17. A bicycle-carrying device according to claim 11, wherein said frame and said feet are shaped and arranged in such a way that in the mounted condition on the motor-vehicle said upper strap elements are out of any interference with a spoiler or other projecting part provided along the rear edge of the motor-vehicle roof.

18. A bicycle-carrying device according to claim 17, wherein in the mounted condition on the motor-vehicle said upper strap elements extend substantially horizontally from the respective upper hooks.

19. A bicycle-carrying device according to claim 1, wherein at least one of the upper and lower receptacles is adjustable in orientation relative to the frame independently from the other ones of the at least one of the upper and lower receptacles.

20. A bicycle-carrying device according to claim 1, wherein the cross-member defines first and second ends and the at least one upper receptacle includes a first upper receptacle mounted adjacent to the first end of the cross-member and a second upper receptacle mounted adjacent to the second end of the cross-member, wherein a first one of the upright frame members extends downwardly from the cross-member and supports a first lower receptacle and a second one of the upright frame members extends downwardly from the cross-member and supports a second lower receptacle, and wherein the cross-member defines an adjustable length and is configured so that a bicycle supported by the first upper and lower receptacles or the second upper and lower receptacles can be arranged in a plane not hiding from view a substantial portion of a rear plate and/or rear lights of the motor-vehicle.

21. A bicycle-carrying device for motor-vehicles, comprising:
a frame for mounting to a motor-vehicle defining an upper end arranged relatively higher with respect to the motor-vehicle and a lower end arranged relatively lower with respect to the motor-vehicle, wherein the frame includes an upper cross-member and a pair of laterally spaced upright members interconnected with the upper cross-member;
a pair of receptacles mounted to the frame that are aligned with each other along a vertical plane parallel to a longitudinal axis of the motor-vehicle to receive a pair of wheels of a bicycle to support the bicycle by the wheels with the bicycle in the vertical plane parallel to the longitudinal direction of the motor-vehicle so that the pair of wheels on the bicycle defines an upper wheel and a lower wheel when the bicycle is supported by the pair of receptacles, the pair of receptacles including an upper receptacle having a portion extending along at least a segment of an outer circumferential surface of the upper wheel of the bicycle to engage a downwardly facing portion of the outer circumferential surface of the upper wheel for supporting the bicycle at the upper wheel from below, and a lower receptacle aligned with the upper receptacle, wherein at least one of the receptacles is movable to varying positions along the length of one of the upright frame members; and a support arrangement carried by the frame for supporting the frame on the rear portion of the motor-vehicle, wherein the support arrangement comprises a plurality of feet including a pair of adjustable feet, wherein each adjustable foot is movably mounted for movement along one of the upright frame members, and wherein the adjustable feet and the movable one of the upper and lower receptacles are separately mounted to and movable on the upright frame member to variable positions along the upright frame member independently of each other.

* * * * *